United States Patent [19]

Camp et al.

[11] 3,887,487

[45] June 3, 1975

[54] PROCESS FOR REMOVING BUBBLES OF GAS FROM LIQUIDS

[75] Inventors: Michel Camp, Lyon; Paul Rostaing, Vienne, both of France

[73] Assignee: Rhone-Poulenc, S.A., Paris, France

[22] Filed: Jan. 31, 1973

[21] Appl. No.: 328,237

[30] Foreign Application Priority Data

Feb. 2, 1972 France .............................. 72.03486

[52] U.S. Cl. ............... 252/321; 252/42.7; 252/49.6; 252/78; 252/358; 260/21; 260/22 T; 260/46.5 Y; 260/448.2 B
[51] Int. Cl. ............................................ B01d 19/04
[58] Field of Search ...... 252/321, 358; 260/448.2 B, 260/46.5 Y

[56] References Cited
UNITED STATES PATENTS

| | | | |
|---|---|---|---|
| 2,375,007 | 5/1945 | Larsen et al. ................... | 252/321 X |
| 2,702,793 | 2/1955 | Smith .............................. | 252/358 X |
| 2,730,532 | 1/1956 | Martin ....................... | 260/46.5 Y X |
| 3,300,418 | 1/1967 | Andres et al. ............. | 260/46.5 Y X |
| 3,455,877 | 7/1969 | Plueddemann ........... | 260/448.2 B X |
| 3,532,644 | 10/1970 | Mange et al. ................... | 252/358 X |

*Primary Examiner*—Richard D. Lovering
*Attorney, Agent, or Firm*—Stevens, Davis, Miller & Mosher

[57] ABSTRACT

Bubbles of gas are removed from liquids e.g. hydraulic fluids or coating compositions, by incorporating therein 0.0001 – 0.25% by weight of an organosilicon compound containing at least one oxirane ring, which is bonded directly to a silicon atom or forms part of an organic radical bonded to a silicon atom by a Si—C bond. The organosilicon compound can be a monomer, a homopolymer, or a copolymer.

7 Claims, No Drawings

PROCESS FOR REMOVING BUBBLES OF GAS FROM LIQUIDS

This invention relates to a process for removing bubbles of gas, and particularly air, disposed in a liquid such as a hydraulic fluid or coating composition, and for inhibiting formation of the dispersion of gas in the liquid.

Diorgano polysiloxane oils can be added to liquids, which flow in contact with air or gases, for the purpose of preventing them from foaming (U.S. Pat. Nos. 3,049,494 and 3,193,504). Although the addition of oils of this type effectively prevents the formation of foams, it has no deaerating action, i.e., it does not make it possible to remove the trapped bubbles of gas: as a result, a situation can arise where these liquids are no longer capable of carrying out their functions, for example, of transmitting pressures.

It is also known to incorporate organopolysiloxane oils (French Pat. No. 1,214,011, U.S.S.R. Pat. No. 250,671, German Pat. No. 1,956,288 and Netherlands Pat. No. 69/11,125) or copolymers containing polysiloxane/polyoxyalkylene blocks (French Pat. Nos. 1,341,066 and 1,353,071) into coating or printing compositions in order to make them easier to spread and to avoid the presence of foams. However, the bubbles of gas are not, in practice, removed from these compositions, and the bubbles thus interfere with the use of the compositions, especially in continuous processes, and hence lead to coatings or printed patterns of poor quality with blisters and craters running through them.

French application No. 2,001,364 states that it is possible to use dimethylpolysiloxane oils to deaerate polyester varnish solutions, subject to the condition, however, that these solutions be made thixotropic by incorporating a particular additive. This technique involves an additional delicate operation, the results of which are not always satisfactory and it is thus not to be recommended for use on an industrial scale.

The present invention provides a process for treating a liquid to remove bubbles of gas dispersed therein or to inhibit formation of the dispersion of gas therein which comprises incorporating into the liquid in an amount of 0.0001% to 0.25% of the weight of the liquid an organosilicon compound containing at least one oxirane ring, which is bonded directly to a silicon atom or forms part of an organic radical bonded to a silicon atom by a Si—C bond.

The organosilicon compounds which can be used according to the process of the present invention can be monomers, homopolymers or copolymers.

The monomers are preferably silanes corresponding to the general formula $$(X)_{3-a}R_a\text{SiD}$$ 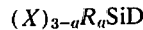

in which the symbol X represents a hydrolysable group, the symbol R is a monovalent hydrocarbon group or a monovalent halogeno-hydrocarbon group, the symbol D an oxirane radical bonded directly to the silicon atom or a monovalent organic radical containing an oxirane ring and bonded to the silicon atom by a Si—C bond, and the symbol $a$ represents 0, 1, 2 or 3.

The term "oxirane radical" as used in this specification means the unsubstituted cyclic monovalent radical

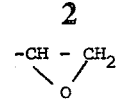

as well as its substituted derivatives.

More particularly, the symbol R can represent an alkyl radical with one to four carbon atoms, a halogenoalkyl radical with one to three carbon atoms, a cycloalkyl radical with five or six carbon atoms in the ring, an alkenyl radical with two to four carbon atoms, an aryl radical with six to ten carbon atoms and a halogenoaryl radical with six or seven carbon atoms; the symbol X can represent a halogen atom, an alkoxy radical with one to four carbon atoms, an alkoxyalkoxy radical with three or four carbon atoms, an acyloxy radical with one to three carbon atoms, a ketoniminoxy radical with three to five carbon atoms, an aldiminoxy radical with two to four carbon atoms, a dialkylaminoxy radical with two to four carbon atoms, and an organoaminyl radical with two to six carbon atoms; the symbol D can represent a radical of the formula

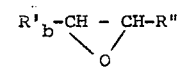

in which the symbol R' represents an alkylene radical with one to six carbon atoms or a divalent radical (bonded to the silicon atom by a C—Si bond and to the

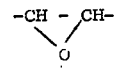

radical by a C—C bond) consisting of alkylene radicals, each of which has one to four carbon atoms, bonded together by oxygen atoms; the symbol R'' represents a hydrogen atom or an alkyl radical with one to three carbon atoms; the symbol $b$ represents 0 or 1, a radical of the formula

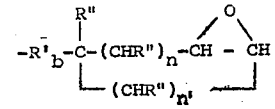

in which the symbols R', R'' and $b$ are as defined above, the symbol $n$ represents 1, 2 or 3 and the symbol $n'$ zero or 1, the sum $n + n'$ being 2 or 3, or a radical of the formula

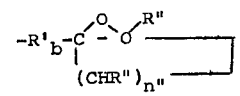

in which the symbols R', R'' and $b$ are as defined above and the symbol $n''$ represents 3 or 4.

Examples of radicals R are, amongst the alkyl and halogenoalkyl radical, methyl, ethyl, n-propyl, isopropyl, n-butyl, isobutyl, chloromethyl and 3,3,3-trifluoropropyl radicals; amongst the cycloalkyl radicals, the cyclopentyl radical, the methylcylopentyl radicals, the cyclohexyl radical and the methylcyclohexyl radicals;

amongst the alkenyl radicals, vinyl, allyl and butenyl radicals; and amongst the aryl and halogenoaryl radicals, the phenyl radical, the tolyl radicals, the xylyl radicals, the cumenyl radical, the chlorophenyl radicals, the dichlorophenyl radicals, the trichlorophenyl radicals and the tetrachlorophenyl radicals.

Examples of radicals X are amongst the halogen atoms, chlorine and fluorine atoms; amongst the alkoxy and alkoxyalkoxy radicals, methoxy, ethoxy, n-propoxy, isopropoxy, n-butoxy, isobutoxy, methoxyethoxy, and ethoxyethoxy radicals; amongst the acyloxy radicals, formyloxy, acetyloxy and propionyloxy radicals; amongst the ketoniminoxy and aldiminoxy radicals, the radicals of the formulae $(CH_3)_2C=NO-$, $C_2H_5(CH_3)C=NO-$, $(C_2H_5)_2C=NO-$, $CH_3CH=NO-$, $C_2H_5CH=NO-$ and $n-C_3H_7CH=NO-$; amongst the dialkylaminoxy radicals, the radicals of the formulae $(CH_3)_2-NO-$, $CH_3(C_2H_5)NO-$ and $(C_2H_5)_2NO-$; and amongst the organoaminyl radicals, the radicals of the formulae $C_3H_7NH-$, $n-C_4H_9NH-$,

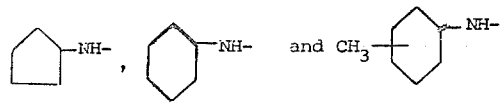

Examples of divalent radicals R' are those of the formulae $-CH_2OCH_2CH_2-$, $-CH_2CH_2OCH_2-$, $-(CH_2)_3OCH_2-$, $-(CH_2)_3(OCH_2CH_2)_2OCH_2-$, $-CH_2-$, $-(CH_2)_2-$, $-(CH_2)_3-$,

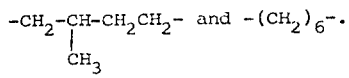

and $-(CH_2)_6-$.

Examples of radicals R'' are methyl, ethyl, isopropyl and propyl radicals.

More specifically, the silanes of the formula I can correspond to the formulae which follow, showing how the various meanings of X, R and D can be combined.

The method of preparing these silanes and their properties are widely described in the chemical literature and in particular in French Pat. Nos. 1,185,009, 1,526,321 and 1,548,971.

The homopolymers which can be used are preferably organopolysiloxanes consisting of units of the formula

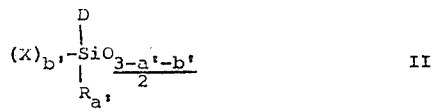

in which the symbols X, D and R are as defined above and each of $a'$ and $b'$, which can be the same or different represents 0, 1 or 2, the sum $a' + b'$ being 0, 1 or 2.

The copolymers, which can be used, preferably consist of units of the formula II, combined with conventional units of formula $R_xSiO_{(4-x')/2}$, the symbol R being as defined above and the symbol $x$ representing 0, 1, 2 or 3.

Examples of suitable organopolysiloxanes are those of the formula

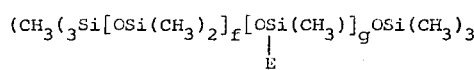

in which

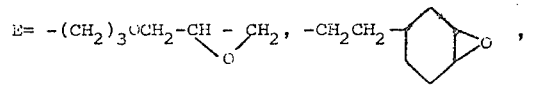

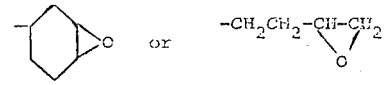

$f = 0$ to $150$ and $g = 1$ to $50$.

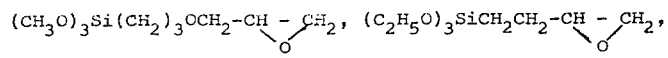

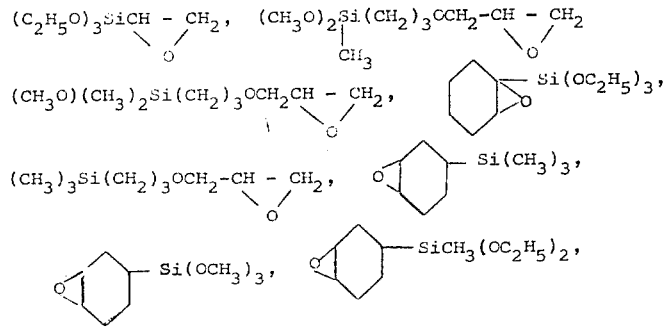

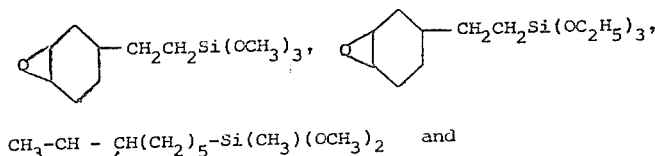

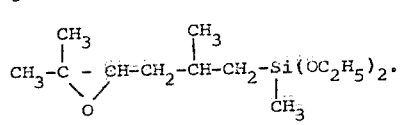

These organopolysiloxanes can be prepared in the usual manner by partial or complete hydrolysis of the silanes of the formula I or by cohydrolysis with conventional silanes, followed by condensation and rearrangement. According to another method of preparation, they can be obtained by epoxidation of organic groups, containing unsaturated aliphatic groups, bonded to silicon atoms by an organopolysiloxane chain (French Pat. 1,222,868).

The organosilicon compounds are added to the liquid in an amount which represents 0.0001% to 0.25% and preferably 0.0008% to 0.15%, of the weight of the liquid, directly or in the form of a solution either in a hydrocarbon solvent or a halogenohydrocarbon solvent, such as a petroleum ether, cyclohexane, methylcyclohexane, toluene, xylene, cumene, chlorobenzene and ortho-dichlorobenzene, or in a more polar solvent such as acetone, methyl ethyl ketone, ethyl acetate, butyl acetate and the methyl mono-ether of ethylene glycol.

The concentration of the organosilicon compounds in these solvents can vary within wide limits and depends on how easily these compounds dissolve. As the amounts of organosilicon compounds employed are very small, it is often easier to measure and to add dilute solutions rather than pure products.

In order to improve the anti-foam properties of these organosilicon compounds, it is sometimes advantageous to combine with them organosilicon polymers such as diorganopolysiloxane oils or rubbers, blocked at each end of their chain by triorganosiloxy groups or hydroxyl or lower alkoxy groups, of viscosity 50 cP at 25°C to 25,000,000 cP at 25°C, mixtures of these oils and rubbers with pyrogenic silica or with precipitated silica, which may or may not have been treated with organosilicon compounds, copolymers containing polysiloxane/polyoxyalkylene blocks such as those described in French Pat. Nos. 1,327,546 and 1,486,749 and organopolysiloxane resins consisting of units chosen from amongst those of the formulae $SiO_2$, $YSiO_{1.5}$, $Y_2SiO$ and $Y_3SiO_{0.5}$ (the symbols Y represent a methyl, 3,3,3,-trifluoro-propyl, phenyl, chlorophenyl or tetrachlorophenyl radical and the average number of groups Y per Si atom ranges from 0.9 to 1.95).

The ratio by weight of organosilicon polymers to organosilicon compounds can range from 0.5:1 to 15:1 or even more, but it is preferable that it be greater than 1.

The liquid compounds, which are capable of being treated according to the process of the invention include the following:

Liquid fluids which are subjected to high pressures and rapid movements such as hydraulic fluids, heating fluids and lubricating oils. These products are most frequently extracted by distillation of petroleum and can consist of paraffinic, naphthenic and aromatic hydrocarbons; synthetic compounds such as polyalkylene glycols, diesters, fluorinated or brominated hydrocarbons, higher alkyl silicates and polyolefines can also be used. It is of primary importance to remove the bubbles of gas, mainly air, from these fluids as otherwise they can prevent the fluids from functioning normally and can cause serious mishaps. These fluids are mainly used in automatic gearboxes and in the hydraulic mechanisms of shovels, excavators and delicate aeronautical and marine equipment.

Coating compositions based on conventional paints or on thixotropic paints applied in thick layers, varnishes and lacquers; these compositions have been widely used for many years and they contain, as the main constituents, in addition to pigments, stabilisers, anti-oxidants, organic resins such as alkyd, polyester, epoxide, acrylic, phenol/formaldehyde, melamine/formaldehyde vinyl, cellulose, polysaccharide, polyimide and polyurethane resins or rubbers such as chlorinated or cyclised rubbers. If it is desired to obtain satisfactory coatings involving application by means of spraying or by means of a coating device, it is necessary to remove the bubbles contained in these compositions and particularly in those based on an alkyd resin or on an unsaturated polyester resin combined with vinyl monomers such as styrene. The usual printing compositions containing pigments, dyestuffs, dispersing agents, binders, solvents and drying agents. These are dispersions of pulverulent solids in more or less viscous liquids. These inks must give supple films which adhere and are dry under hot conditions or in the atmosphere in a relatively short time. It is thus necessary to remove the trapped bubbles before drying in air in order to reproduce the chosen patterns accurately; this removal of bubbles is particularly necessary when a silk-screen printing ink with which a silk screen is impregnated in accordance with the desired pattern, is used and is applied to a substrate consisting of an organic polymer such as polyethylene.

The following Examples illustrate the invention.

EXAMPLE 1

In accordance with the recommendations of Standard Specification DN 51,381, air is bubbled for 7 minutes and under a relative pressure of 150 mm of mercury into 180 cm³ of the oil, the deaerating time of which it is desired to know, at the chosen temperature. When the introduction of air is complete, the way in which the evolution of the air trapped in the oil is progressing is measured by recording the density of the air-in-oil dispersion, by means of a hydrostatic balance, at definite time intervals.

From the results found, a curve is drawn which represents the proportion of air dispersed in the oil in volume % as a function of the time in minutes. The abscissa of the point on this curve, the ordinate of which has a value of 0.2 volume %, represents the deaerating time. The shorter this time is, the better is the oil as a hydraulic fluid.

The following are examined successively, according to this test, at a temperature of 25°C:

A mineral oil P, consisting of paraffinic and naphthenic hydrocarbons, the mineral oil P containing 0.001% of its weight of a copolymer comprising polysiloxane/polyoxyalkylene blocks of the formula:

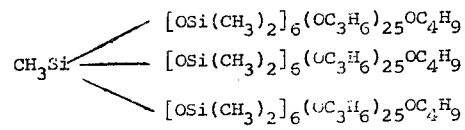

the mineral oil P containing 0.001% of its weight of a dimethylpolysiloxane oil, blocked at each end by a $(CH_3)_3SiO_{0.5}$ unit, of viscosity 100 cPo at 25°C, the mineral oil P containing 0.001% of its weight of a silane of the formula

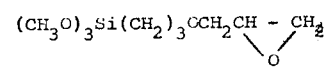

and
the mineral oil P containing 0.001% of its weight of a silane of the formula

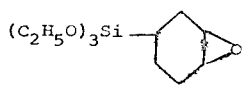

The deaerating times are found to be, respectively, 12 minutes, 14 minutes, 18 minutes, 7 minutes 50 seconds and 8 minutes. It is thus seen that the presence of silanes with epoxy groups assists the removal of the air bubbles; in contrast, the presence of the copolymer comprising polysiloxane/polyoxyalkylene blocks or of the dimethylpolysiloxane oil slows down their removal very considerably.

EXAMPLE 2

An attempt is made to deposit continuously, by means of a sprinkler head supplied by a metering pump, a varnish based on an alkyd resin onto sheets of wood which are conveyed by a moving belt at a speed which can be as high as 90 metres/minute.

The head extends over the entire width of the belt and must allow the resin to flow in the form of a continuous and homogeneous liquid curtain in such a way as to coat the sheets satisfactorily; the excess liquid drains off into channels and is then recycled by means of pumps.

The composition of the varnish is (the parts being by weight):
  70 parts of an alkyd resin formed by reacting glycerine,
  dehydrated acids of castor oil and phthalic anhydride,
  30 parts of a urea/formaldehyde resin and
  100 parts of a mixture of xylene, butanol and naphthenic hydrocarbons.

After operating for 15 minutes, foams form in the sprinkler head and cause the liquid film to disappear completely. The operation is stopped, 0.0025%, relative to the weight of the varnish, of a dimethylpolysiloxane oil, blocked at each end of its chain by a $(CH_3)_3SiO_{0.5}$ unit, of viscosity 500 cPo at 25°C, is added and the machine is started up again.

After operating for 30 minutes, although there are no foams in the sprinkler head, the curtain breaks up in regions. The operation is stopped once again and, in place of the above-mentioned dimethylpolysiloxane oil, the same amount of a silane of the formula T

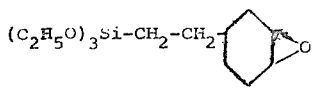

is introduced in a new batch of varnish and the device is started up again. After operating for 6 hours, the liquid curtain is still homogeneous and it is noted that the film obtained, after the coated sheets of wood have been passed through a furnace heated at 135°C, is smooth, coherent and free from defects.

The procedure is carried out as for the above-mentioned silane of the formula T, but substituting in its place either a composition comprising:
  silane of the formula T — 6 parts
  copolymer comprising blocks of the formula

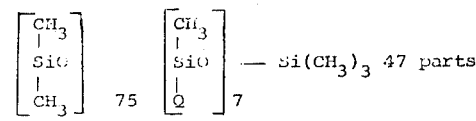

in which $$Q = (CH_2)_3(OCH_2CH_2)_{22}(OCH-CH_2)_{23.5}OCOCH_3,$$
$$\qquad\qquad\qquad\qquad\qquad\quad |$$
$$\qquad\qquad\qquad\qquad\qquad CH_3$$

$\alpha, \omega$-di-(hydroxy)-methylphenylpolysiloxane oil, of viscosity 120 cPo at 25°C, consisting of units of the formulae
  $(CH_3)_2SiO$ and $(C_6H_5)_2SiO$, distributed respectively in the numerical ratio 7/3—47 parts
  and xylene—900 parts
or a composition similar to that above, except that the silane of the formula T is replaced by the same amount by weight of a disiloxane of the formula

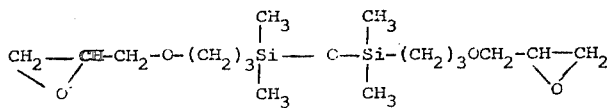

or a composition, also of the same type, except that the silane of the formula T is replaced by the same amount by weight of a polysiloxane of the formula

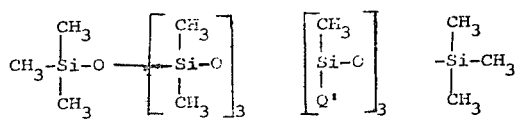

in which

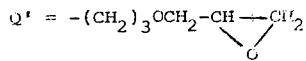

Each composition is used to the extent of 0.8% relative to the weight of the varnish. The same results are obtained as those obtained in the experiment carried out with the silane T alone, but the film produced is not only smooth, coherent and free from defects but is remarkably resistant to scratching.

EXAMPLE 3

A silk-screen printing ink S is used, consisting of (the parts being by weight):
  100 parts of an alkyd resin formed by reacting glycerine, phthalic anhydride and linseed oil,
  50 parts of aliphatic hydrocarbons with a boiling point above 190°C.
  75 parts of titanium oxide,
  75 parts of lithopone and
  2 parts of a mixture of cobalt, manganese and calcium octoate.

Polyethylene sheets, 1 mm thick, are printed continuously, using a stencil consistng of a silk gauze stretched over a frame; a layer of gelatine has previously been deposited on this gauze in order to delimit the desired pattern; the ink is pushed through the meshes which are not masked by the gelatine, by means of a flexible rubber squeegee.

After a few minutes, it is found that the printed designs are not very sharp and have seams and blisters in them. These defects are mainly caused by bubbles of air which escape from the ink which has been deposited during the drying stage.

There is then added to the ink 1% of its weight of a dimethylpolysiloxane oil blocked at each end by a $(CH_3)_3SiO_{0.5}$ unit, of viscosity 200 cPo at 25°C, in the form of a 6% solution in xylene.

After operating for a few minutes, it is found that the improvement in the quality of the reproduction is scarcely noticeable. 0.1% of a silane of the formula

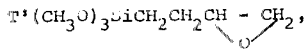

also in the form of a 6% solution in xylene, is then introduced into the ink, in addition to the 1% of the dimethylpolysiloxane oil.

After the printing device has been operating for 4 hours, it is noted that the designs reproduced on the polyethylene sheets are sharp and without defects.

Similar results are obtained when any of the following compositions is used in an amount of 2% by weight relative to the ink, instead of the mixture of the dimethylpolysiloxane oil and the silane of the formula T':
either a composition comprising:
  silane of the formula T'—6 parts
  α,ω-bis-(trimethylsiloxy)-dimethylpolysiloxane oil, of viscosity 100 cPo at 25°C 47 parts and a mixture produced by hot grinding 95 parts of the above-mentioned oil of viscosity 100 cPo at 25°C with 5 parts of pyrogenic silica treated with octamethylcyclotetrasiloxane—47 parts or a composition similar to the above, except that the silane of the formula T' is replaced by the same amount by weight of a disiloxane of the formula:

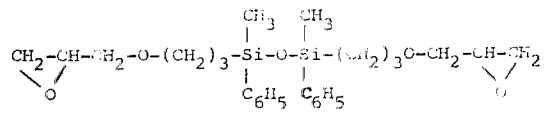

or a composition also of the same type, except that the silane of the formula T' is replaced by the same amount by weight of a polysiloxane of the formula

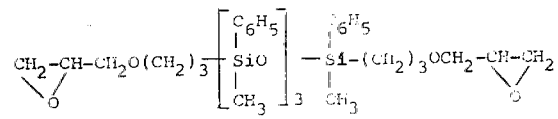

We claim:
1. A process for treating a liquid which is a hydraulic fluid, a heating fluid, a lubricating oil or a printing ink, to remove bubbles of gas dispersed therein or to inhibit formation of the dispersion of gas therein which comprises incorporating into the liquid in an amount of 0.0001% to 0.25% of the weight of the liquid an organosilicon compound containing at least one oxirane ring, which is bonded directly to a silicon atom or forms part of an organic radical bonded to a silicon atom by a Si-C bond, and selected from the group consisting of:
  a. silanes of the general formula $(X)_{3-a}R_aSiD$ in which the symbol X represents a hydrolysable group, the symbol R a monovalent hydrocarbon group or a monovalent halogeno-hydrocarbon group, the symbol D an oxirane radical bonded directly to the silicon atom or a monovalent organic radical containing an oxirane ring and bonded to the silicon atom by a Si—C bond, and the symbol $a$ represents 0, 1, 2 or 3,
  b. organopolysiloxane homopolymers consisting of units of the formula:

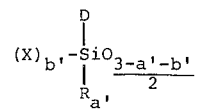

in which the symbols X, D and R are as defined above and each of $a'$ and $b'$, which may be the same or different, represents zero, 1 or 2, the sum $a' + b'$ being 0, 1 or 2, and
  c. organopolysiloxane copolymers consisting of units of the formula

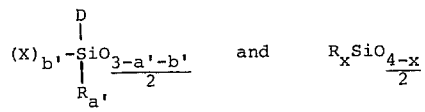

and

the symbols X, D, R, $a'$ and $b'$ being as defined above and the symbol x representing 0, 1, 2 or 3.

2. A process according to claim 1 wherein the organosilicon compound is a silane in which X represents a halogen atom, an alkoxy radical with one to four carbon atoms, an alkoxyalkoxy radical with three or four carbon atoms, an acyloxy radical with one to three carbon atoms, a ketoniminoxy radical with three to five carbon atoms, an aldiminoxy radical with two to four carbon atoms, a dialkyl aminoxy radical with two to four carbon atoms or an organoaminyl radical with two to six carbon atoms.

3. A process according to claim 2 wherein $a$ represents 0 and X represents an alkoxy radical with one to four carbon atoms.

4. A process according to claim 1 wherein the organosilicon compound is an organopolysiloxane homopolymer in which X represents a halogen atom, an alkoxy radical with one to four carbon atoms, an alkoxyalkoxy radical with three or four carbon atoms, an acyloxy radical with one to three carbon atoms, a ketoniminoxy radical with three to five carbon atoms, an aldiminoxy radical with two to four carbon atoms a dialkyl aminoxy radical with two to four carbon atoms or an organoaminyl radical with two to six carbon atoms.

5. A process according to claim 1 wherein the organosilicon compound is an organopolysiloxane copolymer in which X represents a halogen atom, an alkoxy radical with one to four carbon atoms, an alkoxyalkoxy radical with three or four carbon atoms, an acyloxy radical with one to three carbon atoms, a ketoniminoxy radical with three to five carbon atoms, an aldiminoxy radical with two to four carbon atoms, a dialkyl aminoxy radical with two to four carbon atoms or an organoaminyl radical with two to six carbon atoms.

6. A process according to claim 1 which comprises incorporating also an organosilicon antifoaming agent which is a diorganopolysiloxane oil or rubber, blocked at each end of the chain by triorganosiloxy groups or hydroxyl or lower alkoxy groups, of viscosity 50 cP at 25°C to 25,000,000 cP at 25°C, mixtures of these oils and rubbers with pyrogenic silica or with precipitated silica, which are untreated or treated with organosilicon compounds, copolymers containing polysiloxane/polyoxyalkylene blocks and organopolysiloxane resins consisting of units chosen from amongst those of the formulae $SiO_2$, $YSiO_{1.5}$, $Y_2SiO$ and $Y_3SiO_{0.5}$; the symbols Y represent a methyl, 3,3,3,-trifluoro-propyl, phenyl, chlorophenyl or tetrachlorophenyl radical and the average number of groups Y per Si atom ranges from 0.9 to 1.95.

7. A process according to claim 1 wherein into a liquid, which is a mineral oil or alkyd resin, is incorporated an organo silicon compound, which is of formula

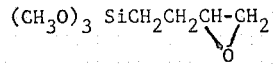

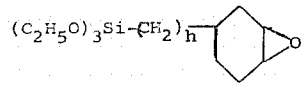

(where h is 0 or 2),

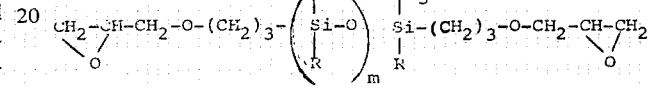

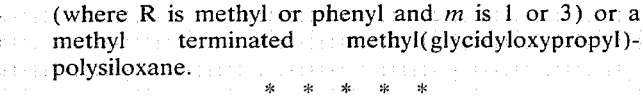

(where R is methyl or phenyl and m is 1 or 3) or a methyl terminated methyl(glycidyloxypropyl)-polysiloxane.

* * * * *